(12) United States Patent
Kaufmann et al.

(10) Patent No.: US 10,876,643 B2
(45) Date of Patent: Dec. 29, 2020

(54) DIAPHRAGM NON-RETURN VALVE FOR A COMPRESSED AIR SYSTEM

(71) Applicant: WABCO Europe BVBA, Brussels (BE)

(72) Inventors: Michael Kaufmann, Gehrden (DE); Armin Sieker, Bielefeld (DE); Arne Stephan, Hannover (DE); Olaf Wichmann, Wennigsen (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 16/329,956

(22) PCT Filed: Jun. 20, 2017

(86) PCT No.: PCT/EP2017/000712
§ 371 (c)(1),
(2) Date: Mar. 1, 2019

(87) PCT Pub. No.: WO2018/041380
PCT Pub. Date: Mar. 8, 2018

(65) Prior Publication Data
US 2019/0195376 A1    Jun. 27, 2019

(30) Foreign Application Priority Data
Sep. 2, 2016 (DE) .......................... 10 2016 010 641

(51) Int. Cl.
*F16K 15/14* (2006.01)
(52) U.S. Cl.
CPC .................... *F16K 15/14* (2013.01)
(58) Field of Classification Search
CPC ............................. F16K 15/14; F16K 15/148
(Continued)

(56) References Cited

U.S. PATENT DOCUMENTS 87,728 A * 3/1869 Taws .................... F16K 15/038
137/512.1
1,438,161 A * 12/1922 Zimmerman ......... F16K 15/036
137/512.1
(Continued)

FOREIGN PATENT DOCUMENTS

DE         483069 C    9/1929
DE        3443078 A1   1/1986
(Continued)

OTHER PUBLICATIONS

International Search Report for WO Application No. PCT/EP2017/000739, dated Aug. 11, 2017, 2 pages.
(Continued)

*Primary Examiner* — Jessica Cahill
(74) *Attorney, Agent, or Firm* — Warner Norcross + Judd LLP

(57) ABSTRACT

A diaphragm non-return valve for a compressed air system is provided herein. The diaphragm non-return valve comprises a housing, a purge output formed on the housing, a valve seat formed on the purge output, and a diaphragm disc which is attached to the housing and which lies on the valve seat in the closed state of the non-return valve and is lifted off the valve seat in the open state of the non-return valve. The diaphragm disc is attached to the housing by a clamping bracket, and the clamping bracket has holding component via which the clamping bracket is attached to the outlet-side end of the purge output.

18 Claims, 5 Drawing Sheets

(58) Field of Classification Search
USPC .................................. 137/843, 854, 846, 855
See application file for complete search history.

(56) References Cited

U.S. PATENT DOCUMENTS

| | | | | |
|---|---|---|---|---|
| 2,270,332 A * | 1/1942 | Osborn, Jr. | ............. | A47J 27/09 137/854 |
| 3,191,618 A * | 6/1965 | McKim | ................. | F01L 3/205 137/855 |
| 3,411,522 A * | 11/1968 | Golden | ............. | G05D 16/0641 137/116.5 |
| 3,610,273 A * | 10/1971 | Russell | ................ | F04B 39/108 137/513.3 |
| 3,623,504 A * | 11/1971 | Davis | ................ | F16K 15/141 137/852 |
| 3,977,734 A * | 8/1976 | Ronnhult | ............. | B60T 8/3605 303/119.3 |
| 4,098,296 A * | 7/1978 | Grasso | ................ | F16K 15/144 137/855 |
| 4,991,621 A * | 2/1991 | Steudler, Jr. | ....... | G05D 16/0683 137/505.46 |
| 5,014,739 A * | 5/1991 | Csaszar | ................ | F16K 15/148 137/512.15 |
| 5,277,484 A | 1/1994 | Kiel | | |
| 5,373,867 A * | 12/1994 | Boyesen | ................ | F01L 3/205 123/73 V |
| 5,518,026 A | 5/1996 | Benjey | | |
| 6,253,788 B1 | 7/2001 | Palvolgyi | | |
| 6,561,143 B2 * | 5/2003 | Holtzman | ............... | F01L 3/205 123/73 V |
| 2012/0042962 A1 * | 2/2012 | Tsai | ...................... | F16K 15/202 137/223 |
| 2014/0373953 A1 * | 12/2014 | Spanevello | ........... | F16K 15/148 137/854 |
| 2015/0114504 A1 * | 4/2015 | Cecka | ................. | A61M 16/208 137/855 |
| 2015/0283882 A1 * | 10/2015 | Juroszek | ................ | F24F 13/14 454/70 |
| 2016/0236666 A1 * | 8/2016 | Sieker | ..................... | B60T 15/18 |

FOREIGN PATENT DOCUMENTS

| | | | | |
|---|---|---|---|---|
| DE | 4136244 A1 | 5/1993 | | |
| DE | 102014002142 A1 | 8/2015 | | |
| GB | 834964 A | * | 5/1960 | ............ E03D 1/012 |

OTHER PUBLICATIONS

Machine assisted translation of DE483069C obtained from https://worldwide.espacenet.com on Feb. 28, 2019, 5 pages.
Machine assisted translation of DE43443078A1 obtained from https://worldwide.espacenet.com on Feb. 28, 2019, 6 pages.
Machine assisted translation of DE102014002142A1 obtained from https://worldwide.espacenet.com on Feb. 28, 2019, 28 pages.

* cited by examiner

DIAPHRAGM NON-RETURN VALVE FOR A COMPRESSED AIR SYSTEM

CROSS-REFERENCE TO RELATED APPLICATIONS

This application is a national phase entry of PCT/EP2017/000712, filed Jun. 20, 2017, which claims priority to German Patent Application No. 10 2016 010 641.7, filed Sep. 2, 2016, both of which are incorporated herein by reference in their entirety.

FIELD OF THE DISCLOSURE

The disclosure concerns a diaphragm non-return valve for a compressed air system, having a housing, a purge output formed on the housing, a valve seat formed on the purge output, and a diaphragm disc which is attached to the housing and which lies on the valve seat in the closed state of the non-return valve and is lifted off the valve seat in the open state of the non-return valve.

BACKGROUND

Road vehicles, in particular heavy goods vehicles, and rail vehicles are frequently equipped with a compressed air supply system from which compressed air consumer circuits, such as service brake circuits, a parking brake circuit, an air suspension circuit, a level control circuit and/or secondary consumer circuits, are supplied with compressed air. In order to modulate the working pressure of compressed air consumers, for example wheel brake cylinders of a service brake circuit, with relatively little control energy, normally relay valves are used. A relay valve has a working pressure input connected to a compressed air source, a working pressure output connected to at least one compressed air consumer, and a purge output leading to atmosphere. The working pressure output can be connected selectively to the working pressure input or to the purge output, or blocked therefrom, via separate inlet valves and outlet valves or a combined inlet and outlet valve, which are each normally controlled by a respective solenoid valve. By connecting the working pressure output to the working pressure input, the working pressure active at the respective compressed air consumer is increased. By connecting the working pressure output to the purge output, the effective working pressure at the compressed air consumer is reduced. By blocking the working pressure output against the working pressure input and the purge output, the effective working pressure at the compressed air consumer is held constant.

U.S. Pat. No. 3,977,734 A discloses a relay valve of a compressed air braking system which has two separate inlet and outlet valves configured as diaphragm valves. The two diaphragm valves are each assigned a respective precontrol valve, configured as a 3/2-way directional control solenoid valve, via which a control chamber adjacent to the diaphragm of the assigned inlet or outlet valve can be alternately loaded with a control pressure taken from the working pressure input or purged.

DE 34 43 078 A1 and DE 41 36 244 A1 each describe a relay valve of a compressed air system which has a combined inlet and outlet valve formed as a piston valve with a relay piston. The two relay valves each have a purge output formed as a cylindrical outlet pipe which can be closed by a check valve formed as a diaphragm valve. The aim of the check valve is to prevent dirt and moisture from penetrating into the interior of the relay valve. The diaphragm valve has a diaphragm disc consisting of a spring-elastic material such as rubber, which lies on a diagonal web of the outlet pipe and is attached thereto centrally. In the closed state, the outer edge of the diaphragm disc lies under preload against a conical sealing face of the inner wall of the outlet pipe. In the open state, which is assumed automatically when the outlet valve is opened because of the outflow of compressed air, the diaphragm disc is folded over outwardly, largely rotationally symmetrically.

In the relay valves according to U.S. Pat. No. 3,977,734 A and DE 34 43 078 A1, the diaphragm disc is in each case secured to the diagonal web of the outlet pipe by a rivet inserted in a central bore. In the relay valve according to DE 41 36 244 A1, the diaphragm disc is secured to the diagonal web of the outlet pipe by a screw inserted in a central threaded bore. In the embodiment of the relay valve according to DE 34 43 078 A1, a disc with a rounded outer edge is arranged between the rivet head and the diaphragm disc, and limits the folding of the diaphragm disc to an outer circular ring surface on opening of the non-return valve and supports a rotationally symmetrical folding of the diaphragm disc.

Because of the largely uncontrolled deformation of the diaphragm disc on opening of the non-return valve, premature damage and fatigue of the diaphragm disc may occur. In this case, dirt and moisture can penetrate into the interior of the non-return valve or relay valve and there lead to malfunction and corrosion. Also, fixing the diaphragm disc onto the diagonal web of the outlet pipe with a central rivet or screw is a relatively complex operation.

BRIEF SUMMARY

A diaphragm non-return valve for a compressed air system is provided herein. The diaphragm non-return valve comprises a housing. The diaphragm non-return valve further comprises a purge output formed on the housing. The diaphragm non-return valve further comprises a valve seat formed on the purge output. The diaphragm non-return valve further comprises a diaphragm disc. The diaphragm disc is attached to the housing. The diaphragm disc lies on the valve seat in the closed state of the non-return valve. The diaphragm disc is lifted off the valve seat in the open state of the non-return valve. The diaphragm disc is attached to the housing by a clamping bracket. The clamping bracket has a holding component via which the clamping bracket is attached to an outlet-side end of the purge output.

BRIEF DESCRIPTION OF THE DRAWING

The invention is described in greater detail below with reference to the accompanying figures, in which.

DETAILED DESCRIPTION

Figure 1:
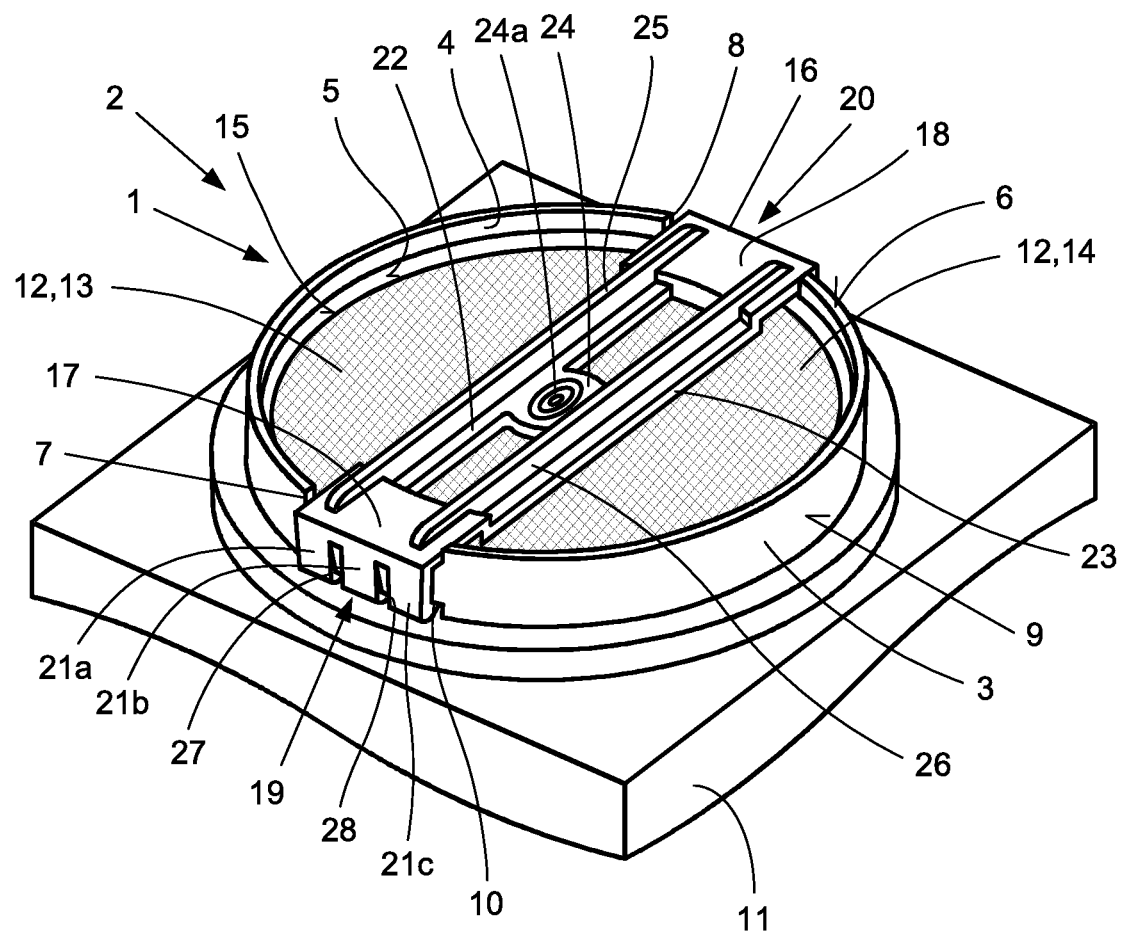
FIG. 1 illustrates a perspective, partial view of one embodiment of a non-return valve with a diaphragm disc arranged at its purge output.

With reference to the specific embodiment of the figures, wherein like numerals generally indicate like parts throughout the several views, a pneumatic non-return valve with diaphragm disc is provided herein. A fixing of the diaphragm disc to the purge output of a valve improves the opening geometry of the diaphragm disc and simplifies installation of the diaphragm disc.

The disclosure is therefore based on a diaphragm non-return valve for a compressed air system, having a housing, a purge output formed on the housing, a valve seat formed on the purge output, and a diaphragm disc which is attached to the housing and which lies on the valve seat in the closed state of the non-return valve and is lifted off the valve seat in the open state of the non-return valve.

As contemplated herein, the diaphragm disc is attached to the housing by a clamping bracket, and the clamping bracket has a holding component via which the bracket is attached to the outlet end of the purge output.

Because the diaphragm disc is fixed to the valve housing by the clamping bracket, it is attached to the outlet pipe and supported over a comparatively large area. For this, the clamping bracket, in certain embodiments, covers the radial center of the diaphragm disc. Also, the diaphragm disc may be fixedly pressed onto the assigned valve seat of the valve housing by the two radial ends of the clamping bracket at their fixing region in the form of a circle portion. Slipping or twisting of the diaphragm disc may be therefore securely prevented even without this being connected to the clamping bracket for example by a central screw, gluing or riveting.

When the non-return valve is opened, the free portions of the diaphragm disc may fold up towards the outside, forming two identical opening cross-sections. This is associated with a comparatively low mechanical load on the diaphragm material. Because the diaphragm disc may be secured by the push-fit, latchable clamping bracket, installation of the non-return valve is also significantly simplified in comparison with fixing the diaphragm disc by a rivet or screw connection, and hence may be cheaper.

With regard to the holding component of the clamping bracket, it may be provided that these are formed as latching clips which may be connected to catches on an outlet pipe arranged on the housing. Mechanically conversely, it may also be provided that the outlet pipe comprises latching clips and the clamping bracket has catches which can be connected together.

The holding component of the clamping bracket may structurally be configured such that they radially outwardly surround the axial outer edge of the outlet pipe, and may be provided with radially inwardly oriented latching lugs which, in mounted state, engage in assigned latching depressions in the outer wall of the outlet pipe.

In order to be able to place the clamping bracket securely in the correct position on the outer edge of the outlet pipe without great effort during installation, in the region of the clamping bracket, the axial outer edge of the outlet pipe may be provided with two diagonally opposed recesses, which in mounted state receive the holding component of the clamping bracket.

In order to achieve the proposed contour and desired elasticity of the clamping bracket, the clamping bracket is, in certain embodiments, made of a spring-elastic plastic and produced as a plastic injection molding.

To guarantee optimal clamping of the diaphragm disc, the clamping bracket advantageously has at least two longitudinal webs which are connected together via the holding component and at least one transverse web. To achieve adequate stability, according to a refinement, the longitudinal webs of the clamping bracket may be each stiffened by a longitudinal rib. To increase their elasticity in the region of the latching lugs, the holding component of the clamping bracket may also be formed segmented by at least one separating slot in the region of the latching lugs.

According to another refinement of the invention, it may be provided that the diaphragm disc is fixedly connected to the clamping bracket, wherein here again, the clamping bracket on one of its axial sides covers the radial center of the diaphragm disc.

For secure and captive connection of the diaphragm disc and clamping bracket, it may be provided that in its radial center, the diaphragm disc has a bore and, radially spaced therefrom, two axially protruding latching studs which each have a depression.

For the interaction of these connections on the diaphragm disc, radially in the center, the clamping bracket may have a transverse web formed as an axial peg which connects the two longitudinal webs radially together. Also, two axially protruding latching pins may be formed on the clamping bracket, with a radial spacing from the peg. In such an embodiment, the diaphragm disc is fixedly connected to the clamping bracket in that the latching pins of the clamping bracket are each fixedly inserted in a respective assigned depression in the latching studs of the diaphragm disc.

The pneumatic valve on which the non-return valve with the features as contemplated herein is arranged or formed, may have a purge channel or several purge channels which are opened to the outside or closed by a single diaphragm disc.

In a pneumatic valve in which the non-return valve has two purge channels, it may be provided that the two purge channels are oriented parallel to each other and separated from each other by a housing web, that the housing web may have an axial bore radially on the inside, that the housing web may have two axially oriented blind holes radially spaced from its axial bore, that the axial bore in the housing web may serve to receive the peg of the clamping bracket pushed through the diaphragm disc, and that the blind holes in the housing web may be provided to receive the axially protruding latching studs of the diaphragm disc.

In this way, two purge channels may be covered by just one diaphragm disc with the function of a non-return valve. The diaphragm disc may be arranged so as to be immovable axially, radially and in the circumferential direction due to its latching studs, the blind holes in the housing and the peg of the clamping bracket pushed axially through its central opening. Only the free, approximately semicircular portions can pivot into the open position and back again into the closed position of the diaphragm disc.

According to another refinement as contemplated herein, it may be provided that on both longitudinal webs of the clamping bracket, at least one respective axially outwardly bent wing is arranged or formed, against which the two free portions of the diaphragm disc which may not clamped between the clamping bracket and the housing web can lie without buckling in their open position. The wings also allow the free portions of the diaphragm disc to lie closely against the wings of the clamping web, such that the free portions of the diaphragm disc do not swing to and fro in the outlet airflow and hence generate undesirable noise.

Since it cannot be excluded that, during overhead transport or with a very steeply angled position of the non-return valve, splash water can undesirably penetrate between the back of the diaphragm disc close to the housing and the valve housing, another advantageous embodiment variant provides that a ring groove, which may be open in the direction towards the diaphragm disc, may be formed in the floor of the valve seat of the non-return valve, and that the floor of the ring groove may be arranged with a fall or at least on a level with the floor of the latching depressions in the outer edge of the outlet pipe which receive the latching lugs of the clamping bracket. In this way, water which may have penetrated into the region of the non-return valve can flow outward from the non-return valve even if the diaphragm disc is in its closed position. As outlined, in this situation, the non-return valve is oriented such that the diaphragm disc in its open position is or would be pivoted away from the ground.

According to an alternative embodiment, for the outflow of water which has undesirably penetrated the non-return valve, it may be provided that an annular groove which is open in the direction towards the diaphragm disc is formed in the floor of the valve seat of the non-return valve, the floor of which groove is connected, with a fall or at least on the same level, to a drainage opening in the housing which may be arranged radially inside the valve seat. Here again, the non-return valve in this situation is oriented such that in its open position, the diaphragm disc is or would be pivoted away from the ground.

According to another variant, it may be provided that instead of a single housing web which separates the two purge channels of the non-return valve from each other, three individual webs are provided which may be arranged spaced from and parallel to each other, wherein the central individual web, radially in the center, may have a hollow cylindrical ring web for receiving the axial peg of the clamping bracket.

Furthermore, it may be provided that before installation, the diaphragm disc has a degree of pre-curvature such that this appears curved approximately in a U-shape when viewed from the end onto its radial peripheral face. Such a diaphragm disc, on installation, may be placed on the assigned valve seat such that its two free portions which can swing up in operation first come to lie there, and the diaphragm disc portion formed in between, i.e. its fixing portion, may then placed or pressed onto the housing web. In this way, the diaphragm disc is pressed flat so that a preload is created. This preload ensures that after pivoting up, the two free portions of the diaphragm disc may be returned securely to the valve seat and come to rest tightly thereon.

It may also be provided that several spot-like protrusions are formed on the underside of the clamping bracket pointing towards the diaphragm disc. In the assembled state of the non-return valve, these may be pressed into the rubber-elastic material of the diaphragm disc with comparatively high surface pressure, whereby the diaphragm disc is additionally secured against slipping or twisting.

Finally, it is noted that the non-return valve as contemplated herein may, in various embodiments, be formed on a relay valve.

It is pointed out here that the non-return valves 1, 101, 201 shown in FIGS. 1 to 5 are, for clearer depiction, drawn rotated through 180° relative to their normal installation orientation. Accordingly, the two free portions 13, 14, 113, 114, 213, 214 of the diaphragm disc 12, 112, 212, in the normal installation position, pivot on a purge process in the direction towards the ground or in the direction towards the road surface.

FIG. 1 accordingly shows a perspective view of a non-return valve 1 showing the features as contemplated herein, which may for example be part of a relay valve of a compressed air system of a vehicle. The housing 11 of the non-return valve 1 or such a non-return valve is shown merely cut away.

The non-return valve 1 has a purge output 2 at which compressed air flows out to the environment when the outlet valve (not shown), which is pneumatically arranged upstream of the non-return valve 1, is open. The purge output 2 has a cylindrical outlet pipe 3 which can be closed by a diaphragm disc 12, whereby the penetration of dirt and moisture into the interior of the non-return valve 1 in particular is prevented.

The non-return valve 1 accordingly has a diaphragm disc 12 which comprises, or consists of, a spring-elastic material, such as for example rubber. The diaphragm disc 12 may be placed centrally on a diagonal web (not shown in FIG. 1) which is arranged centrally in the single opening cross-section of the outlet pipe 3. In the closed state, the outer edge 15 of the diaphragm disc 12 lies against a conical sealing face of the valve seat 5 on the inner wall 4 of the outlet pipe 3. To secure the diaphragm disc 12 to the valve housing 11 by force fit, a clamping bracket 16 may be provided which is attached to the outlet pipe 3 via two end-side holding components 17, 18 with catches 19, 20. The radial width of the diagonal web (not shown) is smaller than that of the clamping bracket 16, and the diagonal web may be arranged below the clamping web 16 with the same orientation.

The diaphragm disc 12 may be fixedly connected centrally to the clamping bracket 16 and the diagonal web (not shown). The clamping force of the clamping bracket 16 may however also be selected so large that this is sufficient, without further aids, to fix the diaphragm disc 12 in its inner clamping region axially, radially and in the circumferential region to the valve housing 11 or the outlet pipe 3.

The holding component 17, 18 of the clamping bracket 16 surround the outer edge 6 of the outlet pipe 3 radially outwardly, and, in certain embodiments, are provided with radially inwardly oriented latching lugs 21a, 21b, 21c, which in mounted state engage in corresponding latching depressions 10 in the outer wall 9 of the outlet pipe 3. In the exemplary embodiment shown, each holding component 17, 18 has three latching lugs 21a, 21b, 21c. To simplify installation, the outer edge 6 of the outlet pipe 3 may be provided with two diagonally opposing recesses 7, 8 which receive the holding components 17, 18 of the clamping bracket 16 in mounted state.

In certain embodiments, the clamping bracket 16 comprises, or consists of, a spring-elastic plastic and may be produced as a plastic injection molding. To optimize the clamping of the diaphragm disc 12, the clamping bracket 16 has two longitudinal webs 22, 23 which may be connected together via the holding components 17, 18 and a central transverse web 24, and are each stiffened by a longitudinal rib 25, 26. To increase their elasticity, the two holding components 17, 18 of the clamping bracket 16 may be each configured segmented in the region of the latching lugs 21a, 21b, 21c by two separating slots 27, 28.

A peg 24a pointing axially inward may be formed on the transverse web 24; the peg may penetrate through the diaphragm disc 12 and may be fixedly inserted in a receiving opening of the diagonal web.

Because the diaphragm disc 12 may be fixed to the diagonal web by a clamping bracket 16, it is clamped between the diagonal web and the clamping bracket 16 over a relatively large area. Under the outflowing compressed air, the two approximately semicircular free portions 13, 14 of the diaphragm disc 12 fold outward, forming two largely identical opening cross-sections on the single purge output 2. Because the diaphragm disc 12 may be secured by the push-fit, latchable clamping bracket 16, installation of the non-return valve 1 is also significantly simplified in comparison with fixing of the diaphragm disc 12 by a rivet or screw connection, and hence cheaper.

Figure 2:
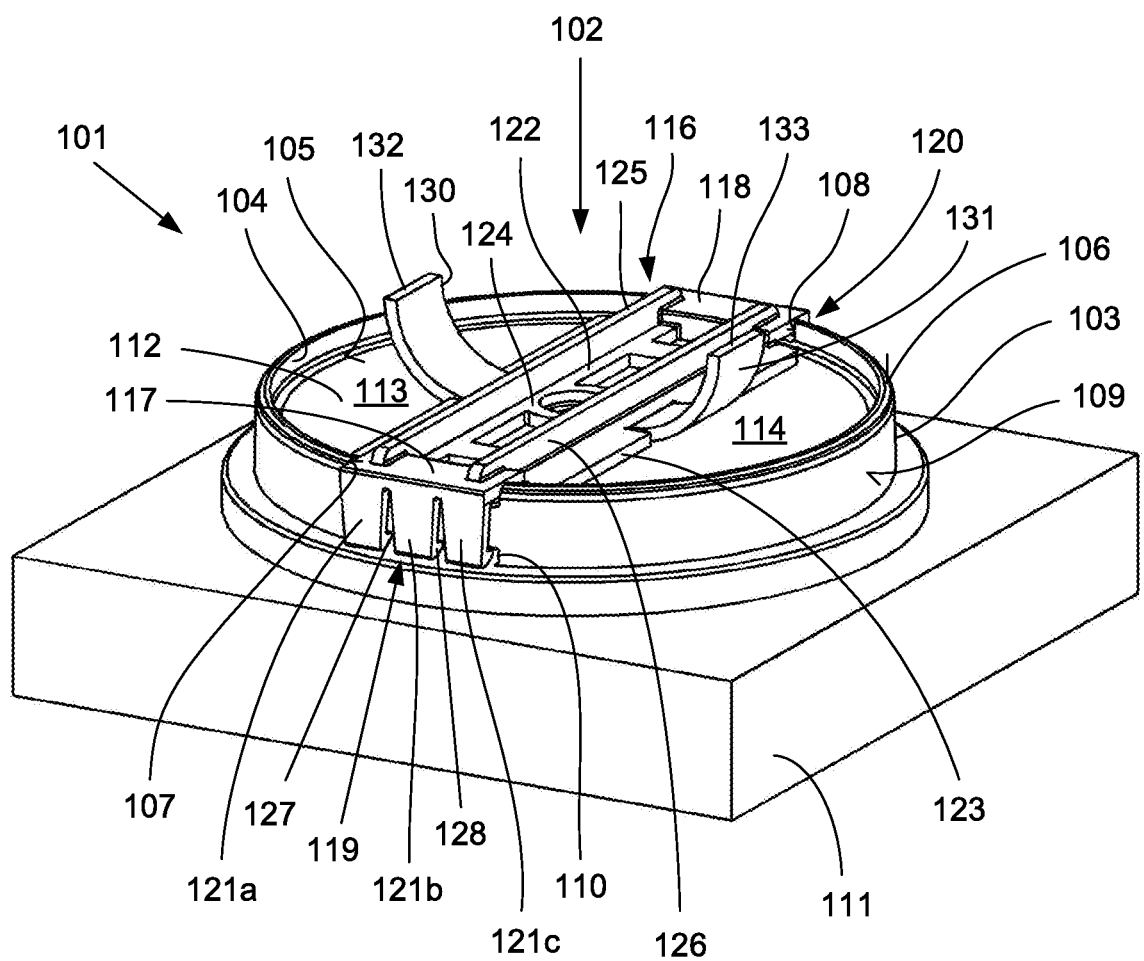
FIG. 2 illustrates a perspective, partial view of another embodiment of a non-return valve with a diaphragm disc arranged at its purge output.

The non-return valve 101 shown in FIG. 2 is largely identical in structure to the non-return valve 1 in FIG. 1. It has a purge output 102 from which, when the outlet valve is opened, compressed air flows out to the environment. The purge output 102 may have a cylindrical outlet pipe 103 which can be closed by the diaphragm disc 112, whereby the penetration of dirt and moisture into the interior of the non-return valve 101 in particular is prevented. The diaphragm disc 112 in this example also comprises, or consists of, a spring-elastic material, such as for example rubber.

The diaphragm disc 112 may be placed centrally on a diagonal web (not visible in FIG. 1) which is arranged centrally in the single opening cross-section of the outlet pipe 103. In the closed state, the outer edge 105 of the diaphragm disc 112 lies against a conical sealing face of a valve seat 105 on the inner wall 104 of the outlet pipe 103. To secure the diaphragm disc 112 to the valve housing 111 by force fit, a clamping bracket 116 may be provided which is attached to the outlet pipe 103 via two end-side holding components 117, 118 with catches 119, 120. The radial width of the diagonal web (not shown) is smaller than that of the clamping bracket 116 and the diagonal web is arranged in the same orientation below the clamping bracket 116.

The diaphragm disc 112 may be fixedly connected in the middle to the clamping bracket 116 and the diagonal web (not shown), but the clamping force of the clamping bracket 116 may also be selected so great that without further aids, this is sufficient to fix the diaphragm disc 112 in its clamping region axially, radially and in the circumferential direction to the valve housing 111 or to the outlet pipe 103.

The holding components 117, 118 of the clamping bracket 116 surround the outer edge 106 of the outlet pipe 103 radially outwardly, and may be provided with radially inwardly oriented latching lugs 121*a*, 121*b*, 121*c* which, in mounted state, engage in corresponding latching depressions 110 in the outer wall 109 of the outlet pipe 103. In the exemplary embodiment shown, each holding component 117, 118 has three latching lugs 121*a*, 121*b*, 121*c*. To simplify installation, the outer edge 6 of the outlet pipe 3 may have two diagonally opposing recesses 107, 108 which in mounted state receive the holding components 117, 118 of the clamping bracket 116.

The clamping bracket 116 according to FIG. 2 may also comprise, or consist of, a spring-elastic plastic and may be produced as a plastic injection molding. To optimize the clamping of the diaphragm disc 112, the clamping bracket 116 may have two longitudinal webs 122, 123 which are connected together via holding components 117, 118 and the central transverse web 124, and are each stiffened by a longitudinal rib 125, 126. The two longitudinal ribs 122, 123 in the non-return valve 101 are evidently slightly wider than in the non-return valve 1 according to FIG. 1. To increase their elasticity, the two holding components 117, 118 of the clamping bracket 116 may also each be formed segmented in the region of the latching lugs 121*a*, 121*b*, 121*c* by two separating slots 127, 128.

In this embodiment, a peg which points axially inward may be formed on the transverse web 124, may penetrate the diaphragm disc 112 and may be fixedly inserted in a receiving opening of the diagonal web.

Because the diaphragm disc 112 may be fixed to the diagonal web by a clamping bracket 116, this is clamped between the diagonal web and the clamping bracket 116 over a relatively large area. Under the outflowing compressed air, the two approximately semicircular free portions 113, 114 of the diaphragm disc 112 fold outward, forming two largely identical opening cross-sections on the single purge output 102.

The feature of the non-return valve 101 shown in FIG. 2 is that an axially outwardly bent wing 130, 131 may be arranged on each of the two longitudinal webs 122, 123 of the clamping bracket 116, against which wing the two free portions 113, 114 of the diaphragm disc 112, which are not clamped between the clamping bracket 116 and the diagonal web (not shown), lie without buckling in their open position. As can be seen, the free ends 132, 133 of the two wings 130, 131 may point away from the housing 111.

Figure 3:
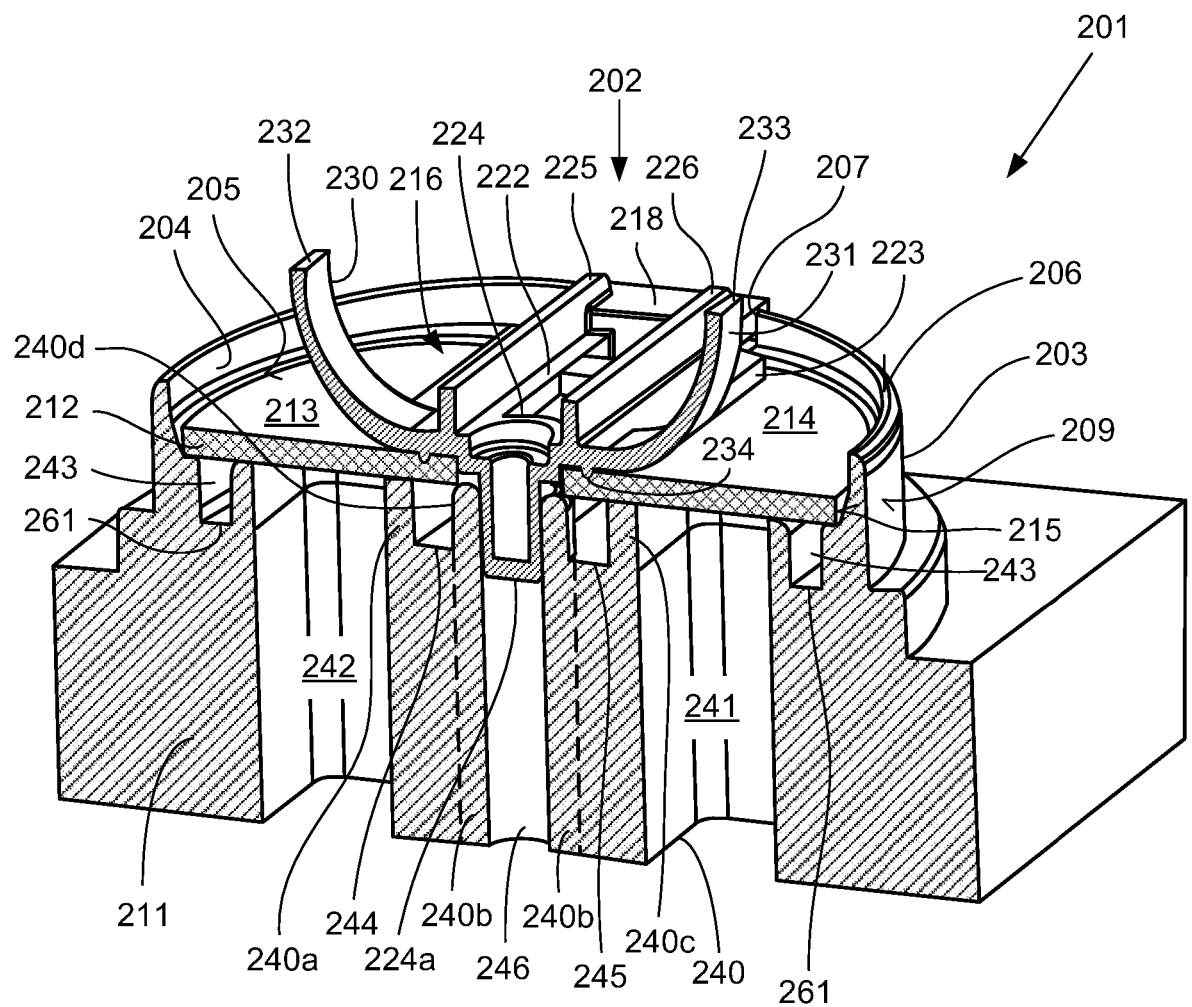
FIG. 3 illustrates another embodiment of a non-return valve in an axial section through two purge channels.
Figure 4:
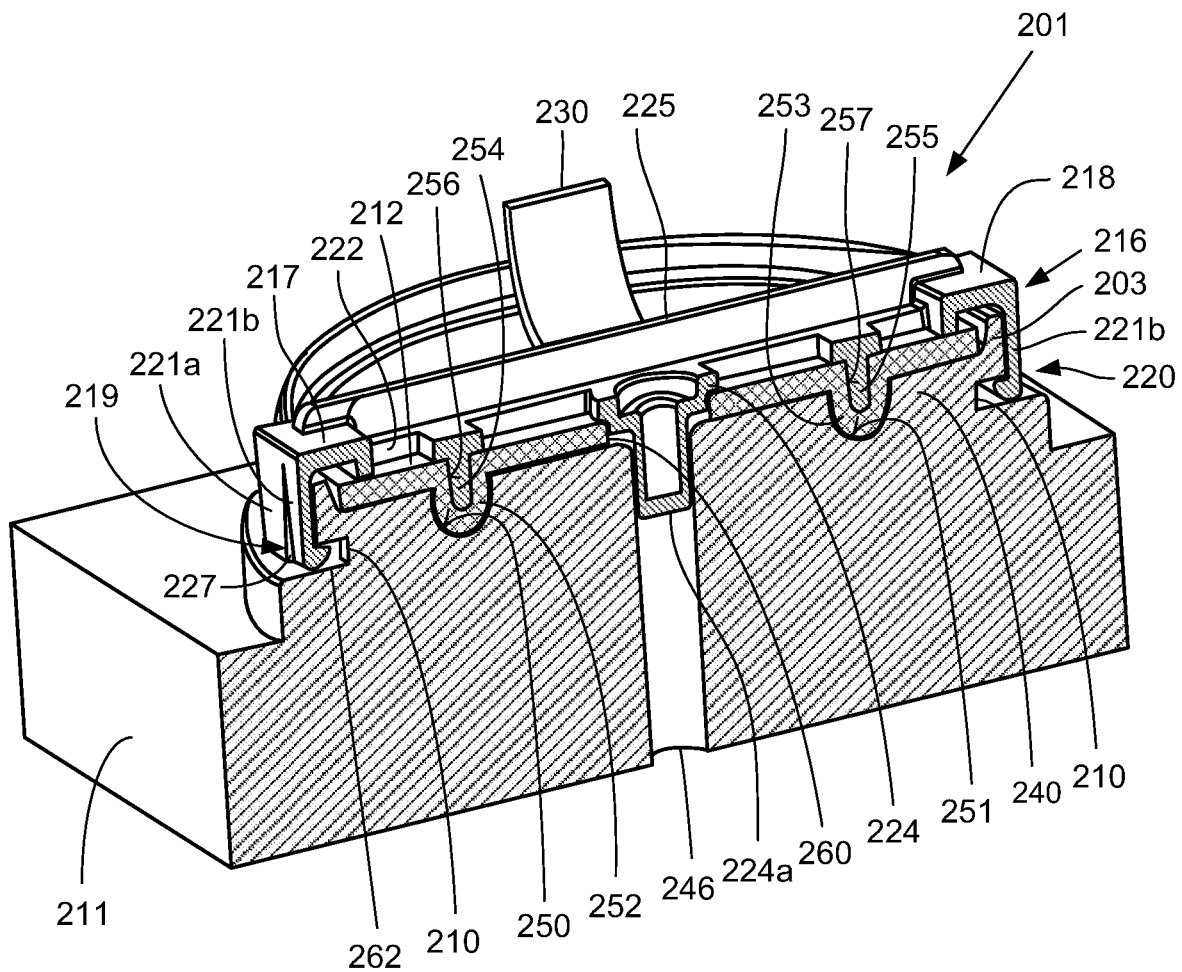
FIG. 4 illustrates the non-return valve according to FIG. 3 in an axial section through a housing web.

Another embodiment of a non-return valve 201 as contemplated herein is shown in FIGS. 3 and 4. FIG. 3 shows a diagrammatic, axial section through the non-return valve 201 centrally across the clamping bracket 216 which is also present there. FIG. 4 shows an axial section through the non-return valve 201 in the region of the housing web 240, which has the same orientation as the diagonal web described in connection with FIGS. 1 and 2, but instead of being a separate component is an integral part of the valve housing 211. A further feature of the housing 211 of the non-return valve 201 in FIGS. 3 and 4 is that this has two separate purge channels 241, 242 which may be covered by a single diaphragm disc 212.

The structure of the non-return valve 201 according to FIGS. 3 and 4 may be as follows. It has a purge output 202 from which, when the outlet valve may be opened, compressed air flows out to the environment. The purge output 202 may be surrounded by a cylindrical outlet pipe 203 which can be closed by the diaphragm disc 212, whereby the penetration of dirt and moisture into the non-return valve 201 and into the two above-mentioned purge channels 241, 242 is prevented.

The non-return valve 201 accordingly has a diaphragm disc 212 which comprises, or consists of, a spring-elastic material such as for example rubber. The diaphragm disc 212 is placed centrally on a housing web 240 which may penetrate the outlet pipe 203 axially in portions. In the closed state, the outer edge 215 of the diaphragm disc 212 lies against a conical sealing face of a valve seat 205 on the inner wall 204 of the outlet pipe 203. To secure the diaphragm disc 212 to the valve housing 211 by force fit, the clamping bracket 216 may be provided, which may be attached to the outlet pipe 203 via two end-side holding components 217, 218 with catches 219, 220. The housing web 240 may be arranged below the clamping web 216 with the same orientation.

The holding components 217, 218 of the clamping bracket 216 surround the outer edge 206 of the outlet pipe 203 radially outwardly, and are provided with radially inwardly oriented latching lugs 221*a*, 221*b* which in mounted state engage in corresponding latching depressions 210 in the outer wall 209 of the outlet pipe 203. In the exemplary embodiment shown, each holding component 217, 218 has three latching lugs 221*a*, 221*b*. The third latching lug is not visible in FIGS. 3 and 4, but is configured in the same way as the third latching lug 21*c*, 121*c* in the exemplary embodiments in FIGS. 1 and 2. To simplify installation, the outer edge 206 of the outlet pipe 203 may be provided with two diagonally opposing recesses 207 which in mounted state receive the holding components 217, 218 of the clamping bracket 216.

The clamping bracket 216 according to FIG. 3 and FIG. 4 may also comprise, or consists of, a spring-elastic plastic and may be produced as a plastic injection molding. To optimize the clamping of the diaphragm disc 212, the clamping bracket 216 has two longitudinal webs 222 which may be connected together via holding components 217, 218 and a central transverse web 224, and may each be stiffened by a longitudinal rib 225, 226. To increase their elasticity, the two holding components 217, 218 of the clamping bracket 216 are also each formed segmented in the region of the latching lugs 121a, 121b, 121c by two separating slots 227.

FIGS. 3 and 4 show that an axially inwardly protruding peg 224a is formed centrally on the transverse web 224 of the clamping bracket 216, which peg may completely penetrate a central bore 260 in the diaphragm disc 212 and may be fixedly inserted in an axial bore 246 in the housing web 240. The peg 224a may be evidently formed pot-like and, in the region in which the peg 224a penetrates the diaphragm disc 212, has an outer diameter which corresponds to the inner diameter of the central bore 260 of the diaphragm disc 212 so that the latter is fixed at this point.

Also, on the underside of the clamping bracket 216 pointing towards the diaphragm disc 212, several spot-like protrusions 234 may be formed which, in assembled state of the non-return valve 201, are pressed into the rubber-elastic material of the diaphragm disc 212 with a comparatively high surface pressure, whereby the diaphragm disc 212 may be additionally secured against slipping or twisting on the clamping bracket 216. These spot-like protrusions 234 are clearly evident on the clamping bracket 216 on both sides of the peg 224a, and, in certain embodiments, several such spot-like protrusions 234 are formed on each of these longitudinal clamping bracket sides over its length. In this way, the diaphragm disc 212 is clamped particularly firmly so that its two free portions 213, 214 can swing up and down optimally.

FIG. 3 very clearly shows that the non-return valve 201 may have two purge channels 241, 241 which may be arranged parallel to each other and covered by a single diaphragm disc 212. The dotted lines in FIG. 3 also indicate that the housing web 240 may consist of three individual webs 240a, 240b, 240b which are arranged integrally on the valve housing 211, spaced apart from and parallel to each other.

FIG. 3 also shows another advantageous refinement of the non-return valve 201 according to FIGS. 3 and 4. Accordingly, it is provided that a ring groove 243 which is open towards the diaphragm disc 212 may be formed in the floor of the valve seat 205 of the non-return valve 201, and that the floor 261 of the ring groove 243 may be arranged with a fall or at least at the level of the floor 262 of the latching depressions 210 in the outer edge 206 of the outlet pipe 203 which receive the latching lugs 221a, 221b of the clamping bracket 216. The ring groove 243 therefore allows any water which may have penetrated into the non-return valve 201 to flow away easily from the non-return valve when the clamping bracket 216 is pointing upward, i.e. away from the ground.

Also, the non-return valve 201 according to FIGS. 3 and 4 has two radial grooves 244, 245 which may be formed on the diaphragm-disc-side of the central housing web 240 or between the second individual web 240b and the first individual web 240a and the third individual web 240c. To form a receiving opening for the peg 224a of the clamping bracket 216, the single housing web 240 or the central second individual web 240b has a hollow cylindrical ring web 240d. These two radial grooves 244, 245 may also be connected radially outwardly to the latching depressions 210 in the outer edge 206 of the outlet pipe 203, so that any water which may have penetrated radially inwardly into the non-return valve 201 can flow radially outward via these latching depressions 210.

FIG. 4 shows that the diaphragm disc 212 may be secured by further fixing components thereon to the clamping bracket 216 and to the single or central housing web 240, 240b. Thus the diaphragm disc 212 as shown in FIG. 4 may have two latching studs 252, 253 between its radial outer edge 215 and its central bore 260, which protrude radially inwardly and are pressed into assigned blind holes 250, 251 formed in the single housing web 240 or in the middle housing web 240b. The latching studs 252, 253 may each have a depression 256, 257 formed as a blind hole, in which a latching pin 254, 255 is pressed, which pins for connection are formed pointing axially inwardly on the clamping bracket 216. When the latching pins 254, 255 are pressed into the assigned depressions 256, 257 of the latching studs 252, 253 on the diaphragm disc 212, the latching studs 252, 253 are widened radially so that they are fixedly arranged in the respective assigned blind holes 250, 251 of the single housing web 240 or the middle housing web 240b. Thus in particular, a circumferential twisting of the diaphragm disc 212 is not possible.

The non-return valve 201 according to FIGS. 3 and 4 also has an axially outwardly bent wing 230, 231 on the two longitudinal webs 222, 223 of the clamping bracket 216, against which wings the two free portions 213, 214 of the diaphragm disc 112 which are not clamped between the clamping bracket 216 and the housing web 240, 240b may lie without buckling in the open position. Evidently, the free ends 232, 233 of the two wings 230, 231 point away from the valve housing 211.

Figure 5:
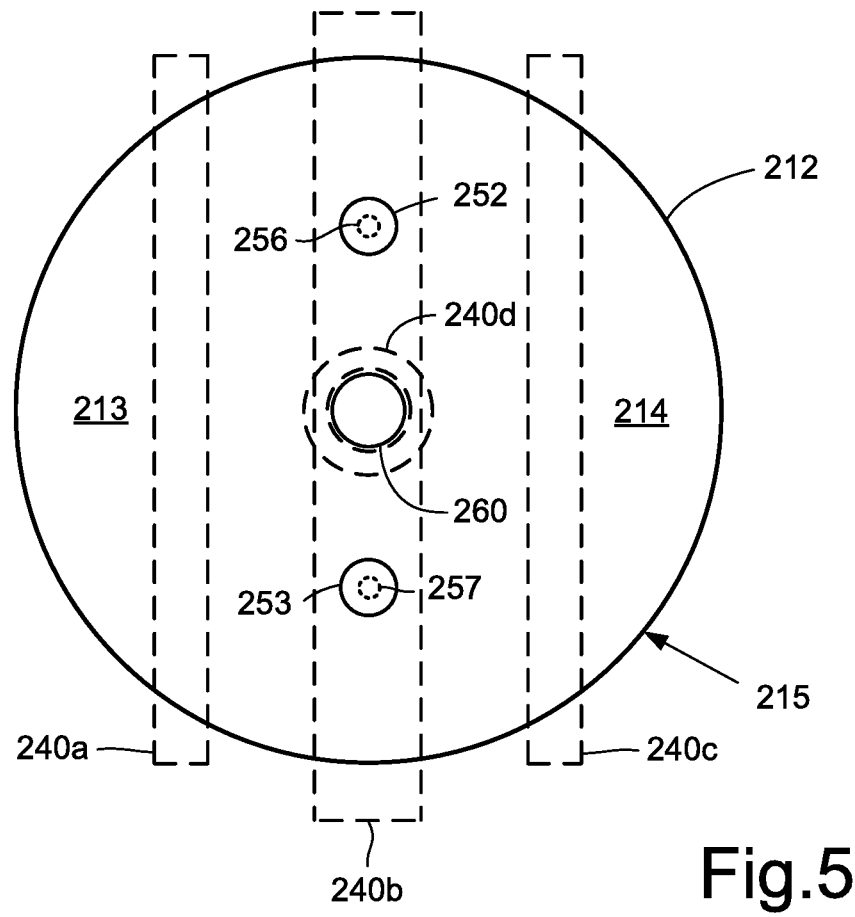
FIG. 5 illustrates a diagrammatic, top view of the axial inside of the diaphragm disc shown in FIG. 4.

FIG. 5 shows an axial top view of the housing-side of the diaphragm disc 212 according to FIGS. 3 and 4. The two pivotable free portions 213, 214 of the diaphragm disc 212 are shown, together with their outer edge 215. Merely for orientation, the positions of the three individual webs 240a, 240b, 240c of the valve housing 212 are shown in dotted lines. The central bore 260 in the diaphragm disc 212, and the two latching studs 252, 253 arranged diametrically opposite each other in relation to the bore 260, and their indicated respective axial depressions 256, 257, are clearly evident. Also, the hollow cylindrical ring web 240d on the central ring web 240b can be seen which surrounds a central bore 260 of the diaphragm disc 212 as a ring.

Figure 6:
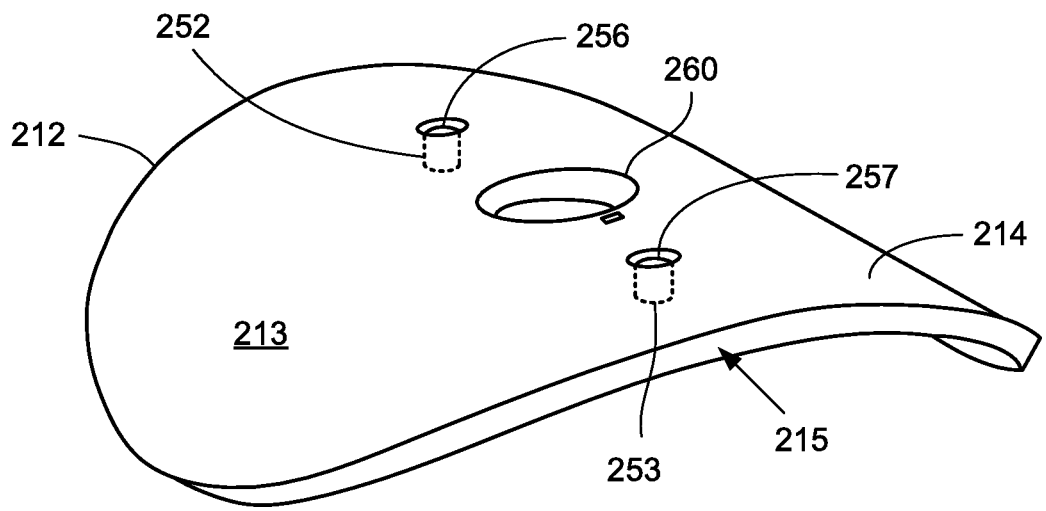
FIG. 6 illustrates a perspective view of the diaphragm disc shown in FIG. 5 with a pre-curvature before installation.

Finally, FIG. 6 shows that the diaphragm disc 212 has a pre-curvature before installation, such that when viewed from the end onto its radial peripheral face, this appears curved in an approximate U-shape. On installation, the diaphragm disc 212 may be placed on the assigned valve seat 205 such that the two free portions 213, 214 which can swing up in operation first come to lie there, and then the diaphragm disc portion formed in between, i.e. its fixing portion, is placed or pressed onto the housing web 240. In this way, the diaphragm disc 212 may be pressed flat so that a preload is created. This preload ensures that after swinging up, the two free portions 213, 214 of the diaphragm disc 212 are returned securely to the valve seat 205 and there come to rest tightly.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A diaphragm non-return valve for a compressed air system, the diaphragm non-return valve comprising a housing, a purge output disposed on the housing, a valve seat disposed on the purge output, and a diaphragm disc attached to the housing and which lies on the valve seat in a closed state of the non-return valve and is lifted off the valve seat in an open state of the non-return valve, wherein the diaphragm disc is attached to the housing by a clamping bracket, wherein the clamping bracket has a holding component via which the clamping bracket is attached to an outlet-side end of the purge output, and wherein the holding component of the clamping bracket is formed as a latching clip which can be connected to a catch on an outlet pipe arranged on the housing, or that mechanically conversely, the outlet pipe comprises a latching clip and the clamping bracket has a catch, wherein the latching clip and the catch can be connected together.

2. The diaphragm non-return valve as claimed in claim 1, wherein the holding component of the clamping bracket radially outwardly surrounds an axial outer edge of the outlet pipe, and are provided with a radially inwardly oriented latching lug which, in mounted state, engage in latching depressions in an outer wall of the outlet pipe.

3. The diaphragm non-return valve as claimed in claim 2, wherein a ring groove which is open in a direction towards the diaphragm disc is formed in a floor of the valve seat of the non-return valve, and a floor of the ring groove is arranged with a slope or at least on a level with a floor of the latching depressions in the axial outer edge of the outlet pipe which receive the latching lugs of the clamping bracket.

4. The diaphragm non-return valve as claimed in claim 2, wherein an annular groove which is open in a direction towards the diaphragm disc is formed in a floor of the valve seat of the non-return valve, and a floor of the ring groove is connected, with a slope or at least on the same level, to a drainage opening in the housing which is arranged radially inside the valve seat.

5. The diaphragm non-return valve as claimed in claim 1, wherein, in a region of the clamping bracket, the axial outer edge of the outlet pipe defines two diagonally opposed recesses which, in mounted state, receive the holding component of the clamping bracket.

6. The diaphragm non-return valve as claimed in claim 1, wherein the clamping bracket is formed of a resilient plastic, and is produced as a plastic injection molding.

7. The diaphragm non-return valve as claimed in claim 1, wherein the clamping bracket comprises at least two longitudinal webs which are connected together via the holding component and at least one transverse web.

8. The diaphragm non-return valve as claimed in claim 7, wherein the longitudinal webs of the clamping bracket are each stiffened by a longitudinal rib.

9. The diaphragm non-return valve as claimed in claim 7, wherein, radially in the center, the clamping bracket has the transverse web formed as an axial peg which connects the two longitudinal webs radially together, and two axially protruding latching pins are formed on the clamping bracket with a radial spacing from the peg.

10. The diaphragm non-return valve as claimed in claim 9, wherein the diaphragm disc is fixedly connected to the clamping bracket and the latching pin of the clamping bracket is fixedly inserted in the depression of the latching studs.

11. The diaphragm non-return valve as claimed in claim 10, wherein, at the purge output, the housing has two purge channels oriented parallel to each other and separated from each other by a housing web, the housing web having an axial bore radially on an interior of the housing web, the housing web having two axially oriented blind holes radially spaced from the axial bore, wherein the axial bore in the housing web serves to receive the peg of the clamping bracket pushed through the diaphragm disc, and wherein the axially oriented blind holes in the housing web are provided to receive the latching studs of the diaphragm disc.

12. The diaphragm non-return valve as claimed in claim 11, wherein, on both longitudinal webs of the clamping bracket, at least one respective axially outwardly bent wing is arranged, against which two free portions of the diaphragm disc, which are not clamped between the clamping bracket and the housing web, lie without buckling in their open position.

13. The diaphragm non-return valve as claimed in claim 11, wherein the housing web is formed from three individual webs which are arranged spaced from and parallel to each other, and wherein a central individual web of the three individual webs, disposed radially centrally relative to the others of the three individual webs, has a hollow cylindrical ring web for receiving the axial peg of the clamping bracket.

14. The diaphragm non-return valve as claimed in claim 1, wherein the diaphragm disc is fixedly connected to the clamping bracket, wherein the clamping bracket, on one of its axial sides, covers a radial center of the diaphragm disc.

15. The diaphragm non-return valve as claimed in claim 1, wherein, before installation, the diaphragm disc has a pre-curvature appearing curved approximately in a U-shape when viewed from an end onto a radial peripheral face of the diaphragm disc.

16. The diaphragm non-return valve as claimed in claim 1, wherein, on an underside of the clamping bracket pointing towards the diaphragm disc, a plurality of spot-like protrusions are formed which are pressed into the diaphragm disc in the assembled state of the non-return valve.

17. A diaphragm non-return valve for a compressed air system, the diaphragm non-return valve comprising a housing, a purge output disposed on the housing, a valve seat disposed on the purge output, and a diaphragm disc attached to the housing and which lies on the valve seat in a closed state of the non-return valve and is lifted off the valve seat in an open state of the non-return valve, wherein the diaphragm disc is attached to the housing by a clamping bracket, wherein the clamping bracket has a holding component via which the clamping bracket is attached to an outlet-side end of the purge output, and wherein, to increase elasticity, the holding component of the clamping bracket is segmented with at least one separating slot in the region of the latching lug.

18. A diaphragm non-return valve for a compressed air system, the diaphragm non-return valve comprising a housing, a purge output disposed on the housing, a valve seat disposed on the purge output, and a diaphragm disc attached to the housing and which lies on the valve seat in a closed state of the non-return valve and is lifted off the valve seat in an open state of the non-return valve, wherein the diaphragm disc is attached to the housing by a clamping bracket, wherein the clamping bracket has a holding component via which the clamping bracket is attached to an outlet-side end of the purge output, wherein the clamping bracket comprises at least two longitudinal webs which are connected together via the holding component and at least one transverse web, and wherein in the radial center, the diaphragm disc defines a bore and, radially spaced therefrom, further comprises two axially protruding latching studs which each having a depression.

* * * * *